United States Patent [19]

Hosoya et al.

[11] 4,422,863

[45] Dec. 27, 1983

[54] APPARATUS AND METHOD FOR BENDING A GLASS TUBE TO A U SHAPE

[75] Inventors: Hisao Hosoya, Yokohama; Yukio Sato, Yokosuka, both of Japan

[73] Assignee: Tokyo Shibaura Denki Kabushiki Kaisha, Kawasaki, Japan

[21] Appl. No.: 339,050

[22] Filed: Jan. 12, 1982

[30] Foreign Application Priority Data

Jan. 23, 1981 [JP] Japan ................................. 56-8764

[51] Int. Cl.$^3$ ............................................. C03B 23/06
[52] U.S. Cl. ..................................... 65/110; 65/108; 65/281
[58] Field of Search ........................... 65/108, 110, 281

[56] References Cited

U.S. PATENT DOCUMENTS

| 2,476,658 | 7/1949 | Greiner | 65/281 |
| 2,593,854 | 4/1952 | Dell | 65/281 |
| 4,283,217 | 8/1981 | Kawamura | 65/108 |
| 4,288,239 | 9/1981 | Hoeh | 65/108 |

FOREIGN PATENT DOCUMENTS 55-108162  8/1980  Japan .

Primary Examiner—Arthur D. Kellogg
Attorney, Agent, or Firm—Schwartz, Jeffery, Schwaab, Mack, Blumenthal & Koch

[57] ABSTRACT

An apparatus for bending a glass tube to a U shape having a pair of chucks for holding the glass tube at both sides, a heating device for heating and softening the glass tube held by the chucks at the predetermined zone for bending, and a turning mechanism for the chucks. The turning centers of the turning mechanism are set each at positions located at a predetermined distance inwardly from an axis of the unbent glass tube held by the chucks. The distance between the turning centers is less than the distance between the axes of straight zones of the glass tube formed after bending. There is also a bending drum for guiding bending, which drum moves forwardly and backwardly into and away from the predetermined zone for bending of the glass tube.

12 Claims, 4 Drawing Figures

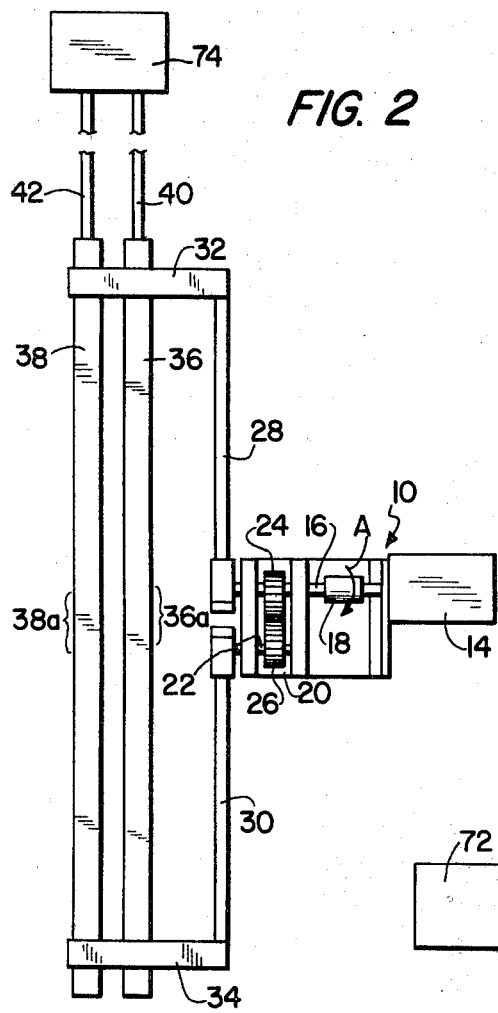
FIG. 2
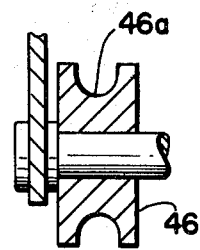
FIG. 4
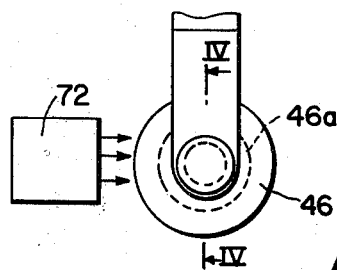
FIG. 3
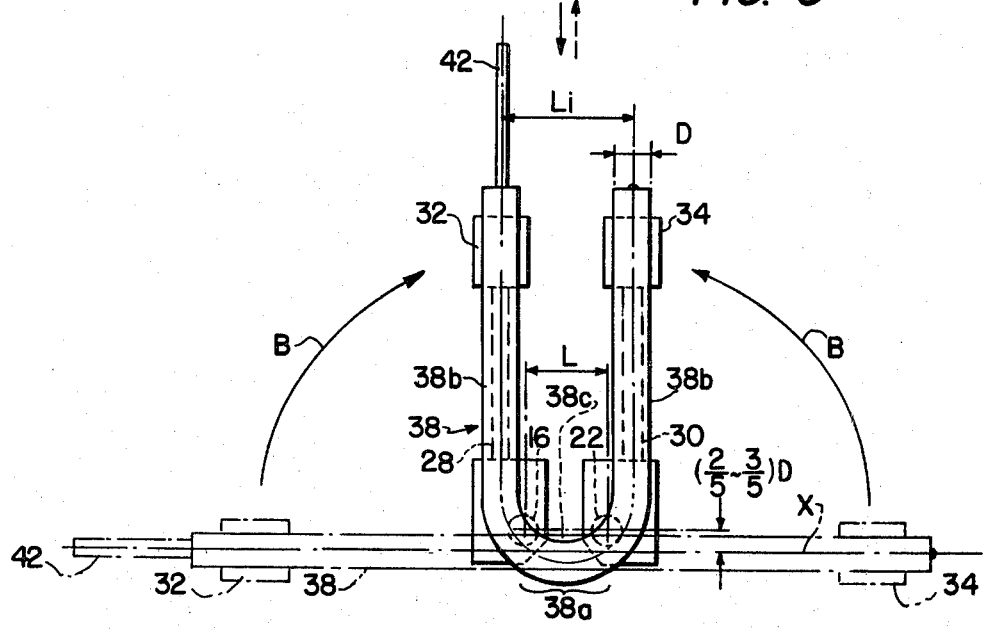

APPARATUS AND METHOD FOR BENDING A GLASS TUBE TO A U SHAPE

BACKGROUND OF THE INVENTION

1. Technical Field of the Disclosure

The present invention relates to an apparatus and method for bending a glass tube to a U shape, and more particularly to an improvement of an apparatus for bending a glass tube to a U shape by using a bending drum. The glass tube may be used for a bulb of U-shaped fluorescent lamps and may have other uses.

2. Description of the Prior Art

A conventional type of apparatus to obtain bulbs for U-shaped fluorescent lamps operates to heat and soften a straight glass tube at a predetermined zone for bending and then to bend the predetermined zone along a circular bending drum with the periphery formed in a groove which is semicircular in section to thus bend the glass tube to a U shape. According to such apparatus, however, the bending drum must be removed from the bent zone of the tube after the tube is bent at the predetermined zone, but since the bent zone is kept wound on the bending drum, the bending drum cannot be taken off unless it is constituted, for example, as a split-type drum. These circumstances have led to inconveniences and to a complicated bending drum structure which, in turn, inevitably requires a complicated mechanism for removing the bending drum from the bent tube. To eliminate such inconveniences, there has been developed a mechanism which will remove the bending drum immediately before the bending process at the predetermined zone for bending comes to completion, i.e., before the predetermined bending zone of the tube is completely wound on the bending drum. However, unsteadiness may result in the bending process after the bending drum is taken off, and this creates a situation where the glass tube cannot be bent accurately to a suitable U shape.

SUMMARY OF THE INVENTION

Therefore, it is an object of the present invention to provide a novel and improved apparatus for bending a glass tube to a U shape by using a bending drum.

It is another object of the invention to provide a novel apparatus for bending a glass tube to a U shape which is simplified in constitution.

It is a further object of the invention to provide a novel apparatus for bending a glass tube to a U shape which removes the bending drum from the bending zone of the glass tube before bending is complete.

It is a still further object to provide a novel apparatus for bending a glass tube which accurately bends the glass tube to a suitable U shape.

In accomplishing the foregoing objects, there has been provided according to the invention an apparatus for bending a glass tube to a U shape comprising a pair of chucks for holding the glass tube at both sides centrally of the predetermined zone for bending, a heating device for heating and softening the glass tube held by the chucks at a predetermined zone for bending, a turning mechanism with the chucks mounted thereon which turns the chucks so as to move the chucks about turning centers toward each other, the turning centers of the chucks being set each at positions spaced a predetermined distance inwardly to one side of the axis of the unbent glass tube held by the chucks. The distance between the turning centers is less than a distance between axes of straight zones of the glass tube to be formed after bending. The apparatus further includes a bending drum for guiding bending at the predetermined zone and a moving device on which the bending drum is mounted for moving the bending drum 9 so that it comes in contact with the predetermined bending zone immediately before the glass tube is bent by the turning mechanism and so that it removes the bending drum from the predetermined bending zone before bending is over.

Other objects, features and attendant advantages of the invention will become readily apparent as the apparatus becomes better understood by reference to the following Detailed Description of Preferred Embodiments, when considered in connection with the accompanying drawings.

BRIEF DESCRIPTION OF THE DRAWINGS

In the drawings, forming a part hereof, in which like reference characters denote like parts in the various views:

FIG. 2 is a plan view of a turning mechanism of the apparatus for bending a glass tube to a U shape according to the preferred embodiment of the invention, FIG. 3 is an enlarged side view illustrating a bending process of a glass tube according to the preferred embodiment of the invention, FIG. 4 is an enlarged sectional view taken on line IV—IV of FIG. 3.

DETAILED DESCRIPTION OF PREFERRED EMBODIMENTS

Figure 1:
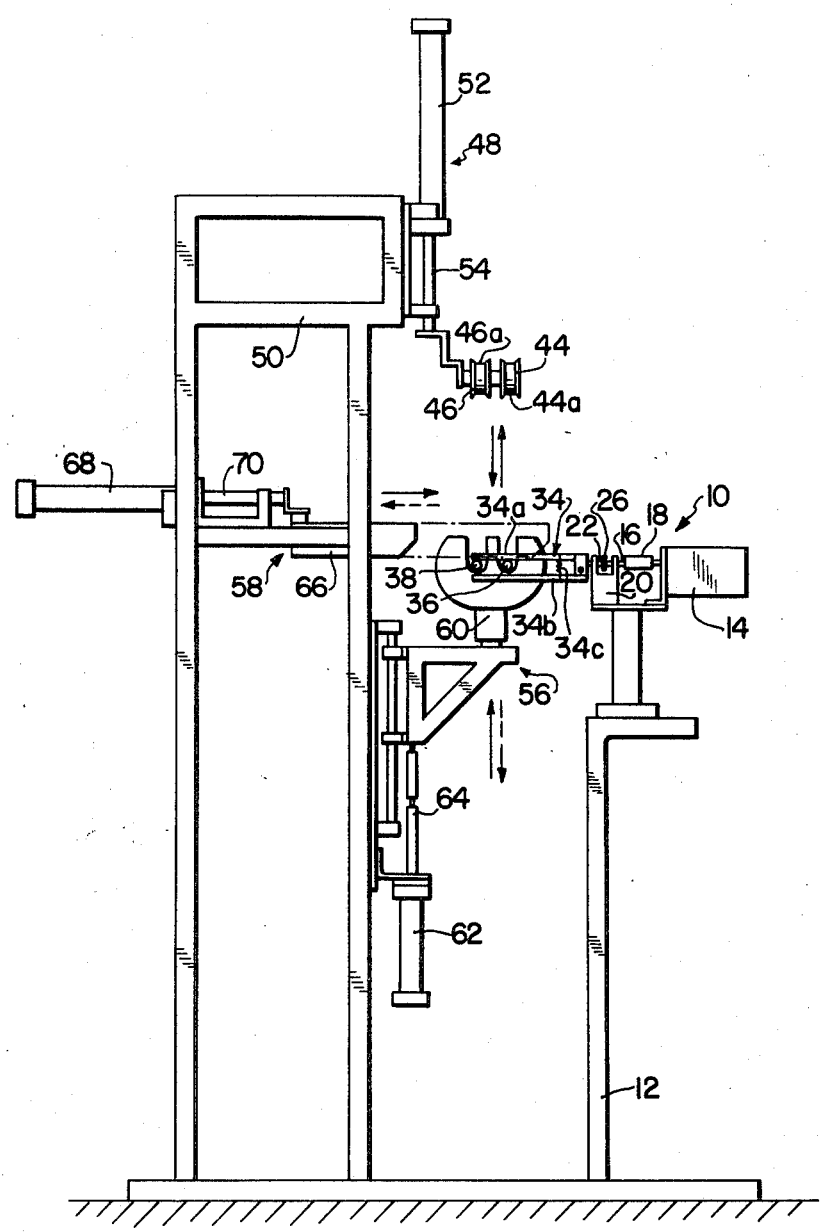
FIG. 1 is a side view of an apparatus for bending a glass tube to a U shape according to a preferred embodiment of the invention.

Now there will be described a preferred embodiment of the invention according to the drawings.

In FIGS. 1 and 2, reference numeral 10 indicates a turning mechanism in the apparatus for bending a glass tube, and the turning mechanism is mounted on a support 12 and equipped with a reversible motor 14. A driving shaft 16 is coupled to the motor 14 through a coupling 18, and the driving shaft 16 is rotatably mounted in a gear box 20. Then, a driven shaft 22, arranged in parallel with the driving shaft 16, is provided rotatably on the gear box 20. The driving shaft 16 and the driven shaft 22 in the gear box 20 are provided with a driving gear 24 and a driven gear 26 engaging with each other, respectively. Turning arms 28 and 30 with the base ends fixed to the driving shaft 16 and the driven shaft 22, respectively, are provided outside the gear box 20.

Chucks 32 and 34 are mounted on the tips of turning arms 28 and 30, and the chucks 32 and 34 function to hold substantially straight glass tubes, for example, two glass tubes 36 and 38, supplied from a preceding process at both sides, i.e., both sides of centrally located predetermined zones 36a and 38a, these being zones for bending of the glass tubes 36 and 38.

Referring to FIG. 1, chuck 34 includes an upper arm 34a which pivots about its right-hand end between open and closed positions relative to a lower arm 34b. The upper arm is shown in the closed position in FIG. 2 in which it grips the glass tubes, and it is biased into that position by a spring 34c. Chuck 32 has essentially the same construction. Of course, in the open position, glass tubes may be placed in or removed from the chuck.

This may be accomplished either manually or by an automatic feeding device (not shown). The glass tubes 36 and 38 may, for example, be sealed by stem mounts (not shown), one end of each having an exhaust tube 40, 42. The tubes may be prepared for bulbs of U-shaped fluorescent lamps. When the motor 14 is rotated in the direction A indicated by the arrow in FIG. 2, rotations of the motor 14 are transferred to one turning arm 28 through the driving shaft 16 and are also transferred to the other turning arm 30 through the driving gear 24, driven gear 26 and driven shaft 22, thus turning the turning arms 28 and 30 and their chucks 32 and 34. These elements are initially disposed 180° opposite to each other, and they are turned so as to be moved in directions toward each other as shown by arrows B in FIG. 3. The range in which the chucks 32 and 34 are turned is set at 90° each from the situation wherein they are kept 180° opposite each other, i.e., they are each moved 90° between their initial and final positions.

The turning centers of the chucks 32 and 34 or axes of the driving shaft 16 and the driven shaft 22 are set at positions deviated a predetermined distance inwardly from each axis X of the glass tubes 36 and 38, which distance preferably falls within the range of from 2/5 to 3/5 of the tube diameter D. This condition is met in the situation wherein the glass tubes 36 and 38 are held by the chucks 32 and 34 before bending as indicated by a phantom line in FIG. 3. If the deviation is less than 2/5 D, there will be a wrinkling on the inner radius 38c of the bend in the tube. If the deviation is more than 3/5, there will be a reduction of the cross-sectional area of the tube in the area of the bend and the wall of the glass tube will become too thin. Further, a distance between the turning centers of the chucks 32 and 34, i.e., a distance L between the axes of the driving shaft 16 and the driven shaft 22, is less than the distance between axes of straight zones of the glass tube formed after bending. This distance between centers is set in a range given by substracting 4/5 to 6/5 of the tube diameter D from a distance $L_i$ between axes of straight tube zones 36b and 38b (only 38b shown in FIG. 3) formed after the glass tubes 36 and 38 are bent, and the relation is given by the following equation. That is, the distance L between the shaft axes (i.e., the distance between turning centers) and the distance $L_i$ between tube axes have the following relationship:

$$L = L_i - (4/5 \sim 6/5)D$$

where D is the tube diameter. If the distance between centers is such that less than 4/5 is subtracted, there will be a wrinkling on the inner radius 38c of the bend in the tube. If the distance between centers is such that more than 6/5 is subtracted, there will be a reduction of the cross-sectional area of the tube in the area of the bend and the wall of the glass tube will become too thin.

Turning to FIG. 1, there are then arranged bending drums 44 and 46 for glass tubes 36 and 38 and a moving device 48 mounted on a frame 50 over the turning mechanism 10 and over the chucks 32 and 34. The moving device 48 includes an expansion cylinder 52 and piston rod 54. The bending drums 44 and 46 are installed on the lower end of a rod 54 of the cylinder 52. The bending drums 44 and 46 are therefore capable of moving vertically by virtue of expansion of the cylinder 52. The bending drums 44 and 46 come into contact with the predetermined zones 36a and 38a immediately before bending of the glass tubes 36 and 38 to guide bending at the predetermined bending zones 36a and 38a. The bending drums include grooves 44a and 46a which are semicircular in section. These grooves are formed, as shown in FIG. 4, on the periphery of the drums so as to accept therein the glass tubes, and specifically the predetermined zones 36a and 38a thereof, for bending.

Then, a main heating device 56 (preferably electric) and an auxiliary heating device 58 (preferably gas) are arranged under and ahead of the turning mechanism 10, respectively. The main heating device 56 includes a main heater 60 for glass tubes 36 and 38 and a main moving mechanism or an expansion cylinder 62 mounted on the frame 50 in vertical disposition. The main heater 60 is fixed on the tip end of a rod 64 of the cylinder 62. The auxiliary heating device 58 has an auxiliary heater 66 and an auxiliary moving mechanism or an expansion cylinder 68 mounted on the frame 50 in a horizontal disposition. The auxiliary heater 66 is fixed on the tip end of a rod 70 of the cylinder 68. When the cylinders 62 and 68 are driven, rods 64 and 70 extend, and main heater 60 and auxiliary heater 66 move into positions under and over the predetermined zones 36a and 38a of the glass tubes 36 and 38 which are held by the chucks 32 and 34. This movement of the cylinders 62 and 68 takes place before bending of the glass tubes at their predetermined zones 36a and 38a and results in heating and softening the predetermined zones 36a and 38a.

Then, a bending drum heating device (schematically illustrated and designated by reference numeral 72) is provided near the moving device 48, which device keeps the bending drums 44 and 46 warm when in the ascended position of FIG. 3. A nitrogen ($N_2$) gas blow device (schematically illustrated in FIG. 2 and designated by reference numeral 74) is connected to exhaust tubes 40 and 42 of the glass tubes 36 and 38, which feeds nitrogen gas into the glass tubes 36 and 38 at the time of bending the predetermined zones 36a and 38a, thereby keeping pressures in the glass tubes 36 and 38 at a given value, e.g., about 300 mm of water.

Next, the operation of the preferred embodiment constituted as above will be described as follows:

First, the glass tubes 36 and 38 are positioned on and held in the chucks 32 and 34, and the turning arms 28 and 30 with the chucks 32 and 34 are kept 180° opposite to each other.

When the expansion cylinders 62 and 68 are driven, the heater 60 of the main heating device 56 is moved upwardly by the rod 64 and the heater 66 of the auxiliary heating device 58 is moved forwardly by the rod 70, thereby heating and softening the glass tubes in their predetermined zones 36a and 38a up to a temperature ready for bending. Preferably, this temperature will be approximately 615° C. Upon heating and softening the predetermined zones 36a and 38a for bending, the heaters 60 and 66 are moved downwardly and backwardly by the operations of cylinders 62 and 68, respectively. The bending drums 44 and 46 are moved downwardly by the moving device 48 to come in contact with the predetermined zones 36a and 38a of the glass tubes for bending. Turning arms 28 and 30 with chucks 32 and 34 are turned in an upward and inward direction toward each other by rotating the motor 14 in the direction A indicated by arrow. As a result, the predetermined zones 36a and 38a for bending are accepted in the grooves 44a and 46a of the bending drums 44 and 46 to accommodate the bending.

Before the predetermined zones 36a and 38a are completely wound on the bending drums 44 and 46, or when the turning arms 28 and 30 are turned through about 60°, for example, from the initial position shown in phantom lines in FIG. 2 to the final position shown in solid lines, the bending drums 44 and 46 are moved upwardly by the moving device 48 and thus removed from the predetermined zones 36a and 38a for bending. The motor 14 is stopped from running simultaneously with completion of turning of the arms 28 and 30 through 90°, at which time the glass tubes 36 and 38 are bent to a U shape as shown in FIG. 3. During such bending process for the glass tubes 36 and 38, nitrogen gas is supplied into the glass tubes 36 and 38 through the exhaust tubes 40 and 42 by the nitrogen gas blow device 74, which pressurizes the interior at about 300 mm of water, thus preventing the predetermined bending zones 36a and 38a from being crushed at the time of bending. The time for blowing nitrogen gas is set so as to overlap somewhat with the time required for the bending process, i.e., the turning time of the arms 28 and 30. After the glass tubes 36 and 38 are thus bent to a U shape, the tubes are cooled down for a given period of time. The chucks 32 and 34 are then opened to draw out the bent glass tubes 36 and 38, and the motor 14 is rotated reversely in the direction A to reset the turning arms 28 and 30 to position 180° opposite to each other, thus finishing the full bending process for the glass tubes 36 and 38 on the bending apparatus.

Since the turning centers of the chucks 32 and 34 or axes of the driving and driven shafts 16, 22 are set at positions deviated inwardly from the axis X of the glass tubes 36 and 38 before bending an amount falling in the range of 2/5 to 3/5 of the diameter D, a length of inside zone 38c after bending becomes longer than that of the predetermined bending zones 36a and 38a at all times when said predetermined zones 36a and 38a is bent, even if the bending drums 44 and 46 are removed during the bending process of the glass tubes 36 and 38. Since a tensile force is consequently exerted not only on the outside of the predetermined zones 36a and 38a but also on the inside at the time of bending, neither swelling nor crushing will result on the bent inside zone 38c.

Furthermore, the distance between the turning centers or the distance L between axes of the driving and driven shafts 16, 22 is set in the range given by subtracting 4/5 to 6/5 of the tube diameter D from the distance $L_1$ between axes of the straight tube zones 36b and 38b which are formed after bending of the glass tubes 36 and 38. Therefore, the straight tube zones 36b and 38b and the predetermined zone 36a and 38b are connected in good condition, and the glass tubes 36 and 38 can be made to a suitable U shape with the straight tube zones 36b and 38b kept in parallel each other and also with the predetermined zones 36a, 38a being almost in a semicircle. Such result was obtained through a test.

A preferred glass composition which has been used contained the following components in the following proportions: $SiO_2$—57.5%, $Al_2O_3$—1.3%, $Fe_2O_3$—0.1%, $Na_2O$—7%, $K_2O$—5.5%, $CaO$—0.25%, $PbO$—27.7%, $As_2O_3$—0.3%, $SbO_3$—0.2%. One type of tube which has been made in accordance with the present invention has an outside radius of bend of 32 mm, a gap between the two straight portions of 28 mm and an outside tube diameter of 18 mm. The thickness of the glass wall of the tube has been in the 1.0-1.2 mm range.

As described, the predetermined zones 36a and 38a can be bent suitably, and the bending drums 44 and 46 can be taken off during the bending process. Therefore, a complicated structure, such as a split-type drum, will not be particularly required for the bending drums 44 and 46 to be taken off the bent glass tube. The structure has therefore been simplified for the bending drums 44 and 46 and the moving device 48.

The practice of the invention is not necessarily limited to the embodiment described above. For example, while the description of the embodiment disclosed herein refers to a case wherein a straight glass tube is bent to a U shape, a glass tube bent once into a U shape can be formed into a saddle shape having three U bends by rebending.

What is claimed is:

1. An apparatus for bending a glass tube to a U shape having two generally parallel legs each having a longitudinal axis, said glass tube having a centrally disposed predetermined zone for bending, a diameter, and an axis, the apparatus comprising:
    a pair of chucks for holding said glass tube at both sides of the centrally disposed predetermined zone for bending;
    a heating device, said heating device cooperating with said chucks so as to heat and soften said glass tube in the predetermined zone for bending;
    a turning mechanism on which said chucks are mounted, said turning mechanism being operable to rotate each of said chucks about a respective turning center, said turning centers being disposed along a line generally parallel to said axis and spaced from said axis by a first predetermined distance, said turning centers being spaced from each other along said line by a second predetermined distance which is less than a third predetermined distance defined by the separation of the longitudinal axes of said generally parallel legs;
    a bending drum to guide bending at said predetermined zone;
    a moving device for said bending drum, said bending drum being mounted on said moving device, said moving device being movable so that said bending drum comes into contact with said glass tube in said predetermined zone thereof immediately before the glass tube is bent by said turning mechanism and so that said bending drum is removed from said predetermined zone of said glass tube before bending is complete.

2. An apparatus for bending a glass tube to a U shape according to claim 1, wherein said first predetermined distance is in the range 2/5 to 3/5 of the diameter of said glass tube; and wherein said second predetermined distance is in a range given by subtracting 4/5 to 6/5 of said glass tube diameter from said third predetermined distance.

3. An apparatus for bending a glass tube to a U shape according to claim 1, wherein said turning mechanism comprises a pair of arms, each said arm having a distal end on which one of said chucks is mounted, and a base end opposite said distal end, said turning mechanism also comprising driving and driven gears mounted on shafts, said gears engaging with each other and being fixed to the base ends of said arms by their respective shafts.

4. An apparatus for bending a glass tube to a U shape according to claim 3, wherein said arms have an initial position for holding a straight glass tube and a final position in which the glass tube has been bent into a U shape, said arms each being movable through an angle of 90° between said initial and final positions.

5. An apparatus for bending a glass tube to a U shape according to claim 1, wherein said heating device comprises a heater and a heater moving mechanism coupled with said heater for bringing said heater to said predetermined zone for bending of said glass tube and for removing said heater from said predetermined zone after heating of the glass tube.

6. An apparatus for bending a glass tube to a U shape according to claim 1, wherein the glass tube, when in said chucks, has an underside and an upper side, which sides define an underside and an upper side of said heating zone, wherein said heating device comprises a main heating device for heating the underside of said predetermined bending zone of said glass tube, and an auxiliary heating device for heating the upper side of said predetermined zone of said glass tube for bending.

7. An apparatus for bending a glass tube to a U shape according to claim 6, wherein said main heating device comprises a main heater and a main heater moving mechanism to which said main heater is coupled for bringing said main heater to a position under said predetermined zone of said glass tube for bending and for removing said main heater from said predetermined zone after heating of the glass tube.

8. An apparatus for bending a glass tube to a U shape according to claim 6, wherein said auxiliary heating device comprises an auxiliary heater and an auxiliary moving mechanism, to which said auxiliary heater is coupled, for bringing said auxiliary heater to a position upper said predetermined zone of the glass tube for bending and for removing said main heater from said predetermined zone after heating of the glass tube.

9. An apparatus for bending a glass tube to a U shape according to claim 3, wherein said moving device removes said bending drum from said predetermined zone when said pair of chucks have moved via their arms through an angle of 60°, respectively, from said initial position toward said final position.

10. An apparatus for bending a glass tube to a U shape according to claim 1 further comprising means for selectively pressurizing the interior of the glass tube at least during the bending process.

11. An apparatus for bending a glass tube to a U shape according to claim 1, wherein said pair of chucks, said heating device and said bending drum each include means for treating a plurality of glass tubes.

12. A method for bending a glass tube into a U shape, the glass tube having a longitudinal axis and a predetermined zone for bending, the method comprising the steps of:
(a) positioning a glass tube in a pair of spaced chucks, such that the tube extends between the chucks, each of the chucks being disposed on an arm which turns about a separate turning point, said turning points being spaced from each other along a line parallel to and spaced from said longitudinal axis;
(b) moving a heater into a position adjacent to the predetermined bending zone of the glass tube;
(c) heating the predetermined zone of the glass tube to a temperature ready for bending;
(d) removing the heater from its position adjacent the predetermined zone;
(e) advancing a bending drum into contact with the predetermined bending zone of the glass tube;
(f) turning the arms about their respective turning points to move the chucks toward one another, thereby winding the predetermined bending zone about the bending drum; and
(g) retracting the bending drum from the predetermined bending zone before said turning step is complete.

* * * * *